US012628152B2

(12) United States Patent
Nalla et al.

(10) Patent No.: US 12,628,152 B2
(45) Date of Patent: May 12, 2026

(54) DETERMINING PEAK CONNECTIONS IN A DISTRIBUTED ENVIRONMENT

(71) Applicant: Rakuten Symphony, Inc., Tokyo (JP)

(72) Inventors: Pradeep Kumar Nalla, Bangalore (IN); Raghavendra, Banglore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 507 days.

(21) Appl. No.: 18/013,640

(22) PCT Filed: Oct. 19, 2022

(86) PCT No.: PCT/US2022/078385
§ 371 (c)(1),
(2) Date: Dec. 29, 2022

(87) PCT Pub. No.: WO2024/049485
PCT Pub. Date: Mar. 7, 2024

(65) Prior Publication Data
US 2024/0224258 A1     Jul. 4, 2024

(30) Foreign Application Priority Data

Sep. 2, 2022     (IN) ............................ 202241050321

(51) Int. Cl.
*H04W 72/121*     (2023.01)
*H04W 72/0446*     (2023.01)
*H04W 72/20*     (2023.01)

(52) U.S. Cl.
CPC ..... *H04W 72/121* (2013.01); *H04W 72/0446* (2013.01); *H04W 72/20* (2023.01)

(58) Field of Classification Search
CPC ........... H04W 72/121; H04W 72/0446; H04W 72/20; H04W 28/02; H04W 24/02; H04W 88/085; H04L 47/125; H04L 12/12
See application file for complete search history.

(56) References Cited

U.S. PATENT DOCUMENTS

| | | | |
|---|---|---|---|
| 2010/0002637 A1* | 1/2010 | Huoviala | ............ H04W 72/566 370/329 |
| 2011/0122779 A1* | 5/2011 | Meirosu | .............. H04W 28/088 370/252 |

(Continued)

FOREIGN PATENT DOCUMENTS

WO     WO-2017017265 A1     2/2017

OTHER PUBLICATIONS

3GPP TS 32.425, 3rd Generation Partnership Project, Technical Specification Group Services and System Aspects, Telecommunication management, Performance Management (PM), Performance measurements Evolved Universal Terrestrial Radio Access Network (E-UTRAN) (Release 17), Jun. 2021.

(Continued)

*Primary Examiner* — Rina C Pancholi
(74) *Attorney, Agent, or Firm* — Sughrue Mion, PLLC

(57)     ABSTRACT

Computer-implemented methods, apparatuses, and non-transitory storage media for determining peak connections in a distributed environment are provided. In some implementations, determining peak connections in a distributed environment can include receiving, according to a predetermined time schedule, data indicating a number of user equipments (UEs) connected to and a number of UEs disconnected from each of a plurality of scheduling units of a radio access network (RAN) during each of a plurality of time windows in a first period of time, determining, based on the received data, a maximum number of UEs connected to the scheduling units at a time in the first period of time, and transmitting the determined maximum number of UEs to a network manager of the RAN.

18 Claims, 14 Drawing Sheets

(56)  References Cited

U.S. PATENT DOCUMENTS

| | | |
|---|---|---|
| 2014/0287713 A1 | 9/2014 | Kijiya et al. |
| 2016/0128119 A1 | 5/2016 | Maheshwari |
| 2018/0077715 A1 | 3/2018 | Oyama |
| 2024/0152820 A1* | 5/2024 | Singh .................... H04W 24/02 |

OTHER PUBLICATIONS

International Search Report and Written Opinion for Intl. Pat. App. No. PCT/US2022/078385 mailed Jan. 6, 2022.

* cited by examiner

FIG. 8.

| Header: Reference Connected UE(X), Total Number of Records | |
|---|---|
| Epoch time | +1 |
| Epoch time | +1 |
| Epoch time | +1 |
| Epoch time | +1 |
| Epoch time | -1 |
| Epoch time | +1 |
| Epoch time | -1 |
| Epoch time | -1 |

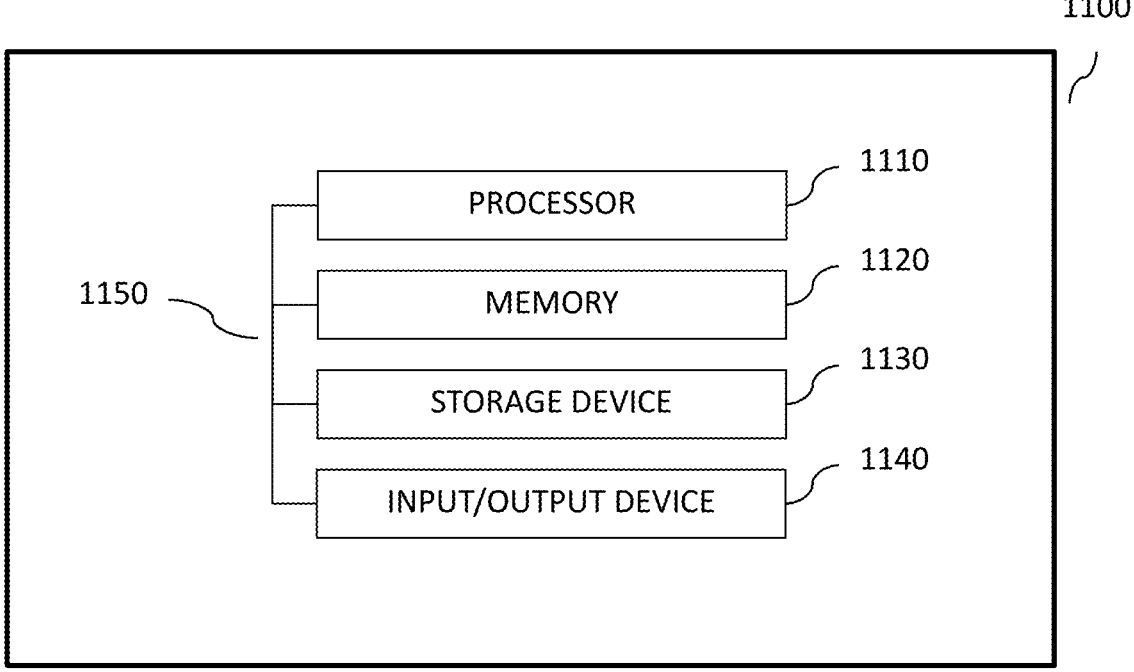

1150

PROCESSOR — 1110

MEMORY — 1120

STORAGE DEVICE — 1130

INPUT/OUTPUT DEVICE — 1140

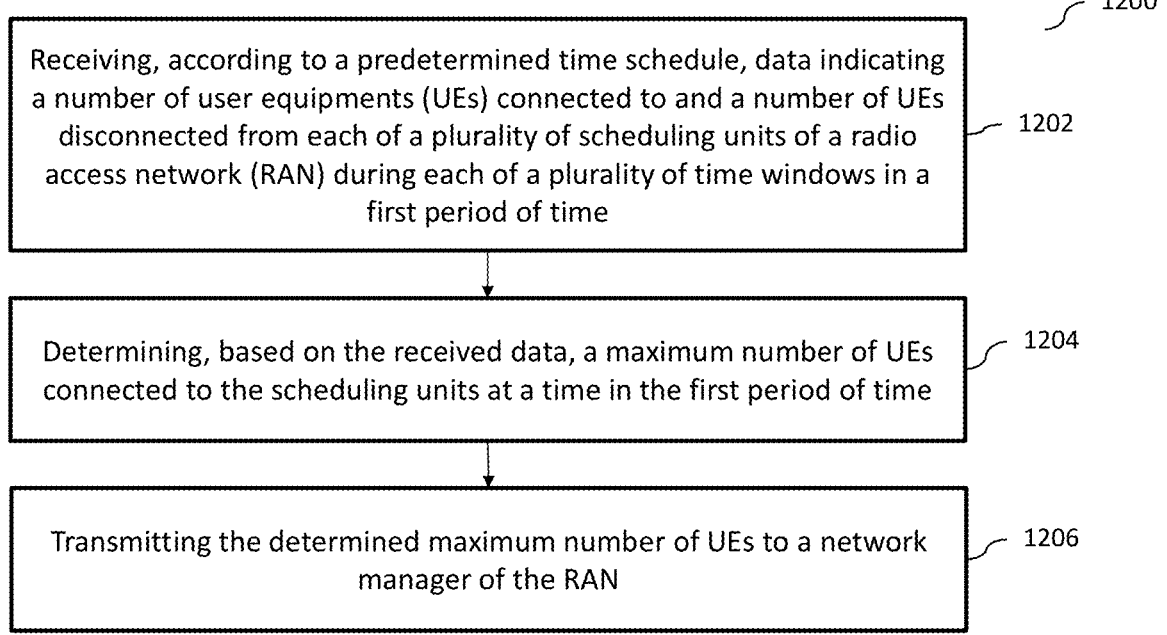

Receiving, according to a predetermined time schedule, data indicating a number of user equipments (UEs) connected to and a number of UEs disconnected from each of a plurality of scheduling units of a radio access network (RAN) during each of a plurality of time windows in a first period of time — 1202

Determining, based on the received data, a maximum number of UEs connected to the scheduling units at a time in the first period of time — 1204

Transmitting the determined maximum number of UEs to a network manager of the RAN — 1206

DETERMINING PEAK CONNECTIONS IN A DISTRIBUTED ENVIRONMENT

CROSS-REFERENCE TO RELATED APPLICATIONS

The present application claims priority to and is the 35 U.S.C. 371 United State National Phase application based on International Patent Application No. PCT/US22/78385, filed Oct. 19, 2022, and entitled "DETERMINING PEAK CONNECTIONS IN A DISTRIBUTED ENVIRON-MENT," which claims priority to Indian Patent Application number 202241050321 filed Sep. 2, 2022, and entitled "DETERMINING PEAK CONNECTIONS IN A DISTRIB-UTED ENVIRONMENT," and incorporates their disclo-sures herein by reference in their entireties.

TECHNICAL FIELD

In some implementations, the current subject matter relates to telecommunications systems, and in particular, to determining peak connections in a distributed environment, such as an open-radio access network ("O-RAN") architec-ture system, a virtual RAN system, long term evolution communications systems, 5G New Radio ("NR") commu-nications systems, and any other systems.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geo-graphic area, which enables a large number of mobile telephones, and/or other wireless devices or portable trans-ceivers to communicate with each other and with fixed transceivers and telephones anywhere in the network. Such communications are performed through base stations and are accomplished even if the mobile transceivers are moving through more than one cell during transmission. world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simul-taneous usage of the networks by many callers with less interference. Coverage by a cell site can depend on a particular geographical location and/or a number of users that can potentially use the network. For example, in a city, a cell site can have a range of up to approximately ½ mile: in rural areas, the range can be as much as 5 miles: and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Uni-versal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access net-works and core networks. The radio access network ("RAN") can include network functions that can handle radio layer communications processing. The core network can include network functions that can handle higher layer communications, e.g., internet protocol ("IP"), transport layer and applications layer. In some cases, the RAN func-tions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

Conventional radio access networks typically provide wireless communication capabilities to a large number of communications mobile phones and mobile computing devices using scheduling units that each have a predeter-mined handling capacity. However, it can be difficult to efficiently distribute the load of the communications mobile phones and mobile computing devices across the scheduling units of the RAN. For example, communications mobile phones and mobile computing devices frequently connect and disconnect from the network such that the number of communications mobile phones and mobile computing devices associated with each scheduling unit can fluctuate frequently over time. It can therefore be difficult to deter-mine how to distribute the load among the RAN's sched-uling units since a current number of communications mobile phones and mobile computing devices associated with each of the scheduling units may not be known. Connections and disconnections of communications mobile phones and mobile computing devices may be reported in real time to a common entity of the RAN configured to distribute communications mobile phones and mobile com-puting devices among the scheduling units, but such report-ing may require a large amount of bandwidth, processing resources, and/or memory capability.

Thus, there is a need to determine peak connections in a distributed environment.

SUMMARY

In some implementations, the current subject matter relates to a computer-implemented method. The method may include receiving, according to a predetermined time schedule, data indicating a number of user equipments (UEs) connected to and a number of UEs disconnected from each of a plurality of scheduling units of a radio access network (RAN) during each of a plurality of time windows in a first period of time. The method may also include determining, based on the received data, a maximum number of UEs connected to the scheduling units at a time in the first period of time. The method may also include transmitting the determined maximum number of UEs to a network manager of the RAN.

In some implementations, the current subject matter can include one or more of the following optional features. In some implementations, the received data may be time stamped such that the time of the maximum number of UEs connected to the scheduling units is a known time.

In some implementations, the predetermined time schedule may be such that data is received after each successive passage of a predetermined period of time in each of the time windows.

In some implementations, the data may be received at an end of each of the plurality of time windows.

In some implementations, each of the time windows may be a predetermined length of time, and the first period of time may be a sum of each of the predetermined lengths of time.

In some implementations, the determined maximum number of UEs may be transmitted to the network manager after an end of the first period of time.

In some implementations, the method may further include repeating the receiving, the determining, and the transmitting for each of at least one additional period of time after the first period of time.

In some implementations, the scheduling units may be associated with at least one of: a control plane component and a user plane component of a centralized unit of a base station. Further, the scheduling units may be associated with the control plane component of the centralized unit of the base station, and/or the base station may include at least one of the following: an eNodeB base station, a gNodeB base station, a wireless base station, a wireless access point, and any combination thereof. Further, the base station may include a centralized unit having a processor communicatively coupled to a memory, and the receiving, the determining, and the transmitting may be performed by the centralized unit. Further, the centralized unit may include at least one of: a control plane component, a user plane component, and any combination thereof. Further, the centralized unit may be communicatively coupled with at least one distributed unit (DU), each of the at least one DUs may be communicatively coupled with at least one radio unit (RU), and the UEs connected to the scheduling units may be communicatively coupled to the at least one RUs. Further, the centralized unit may be operating in an open-radio access network (O-RAN) or in a virtual RAN.

In some implementations, the receiving, the determining, and the transmitting may be performed by a base station in a wireless communication system. Further, the base station may include at least one of the following: an eNodeB base station, a gNodeB base station, a wireless base station, a wireless access point, and any combination thereof. Further, the base station may include a centralized unit having a processor communicatively coupled to a memory, and the receiving, the determining, and the transmitting may be performed by the centralized unit. Further, the centralized unit may include at least one of: a control plane component, a user plane component, and any combination thereof. Further, the centralized unit may be communicatively coupled with at least one distributed unit (DU), each of the at least one DUs may be communicatively coupled with at least one radio unit (RU), and the UEs connected to the scheduling units may be communicatively coupled to the at least one RUs. Further, the centralized unit may be operating in an open-radio access network (O-RAN) or in a virtual RAN.

In some implementations, the receiving, the determining, and the transmitting may be performed by a radio access network (RAN) node having at least one processor communicatively coupled to at least one memory.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 8 illustrates user equipments connected to and disconnected from four scheduling units in four time windows in each of two period of times, according to some implementations of the current subject matter:

FIG. 11 illustrates an exemplary system, according to some implementations of the current subject matter; and FIG. 12 illustrates an exemplary method for determining peak connections in a distributed environment, according to some implementations of the current subject matter.

DETAILED DESCRIPTION

Figure 1A:
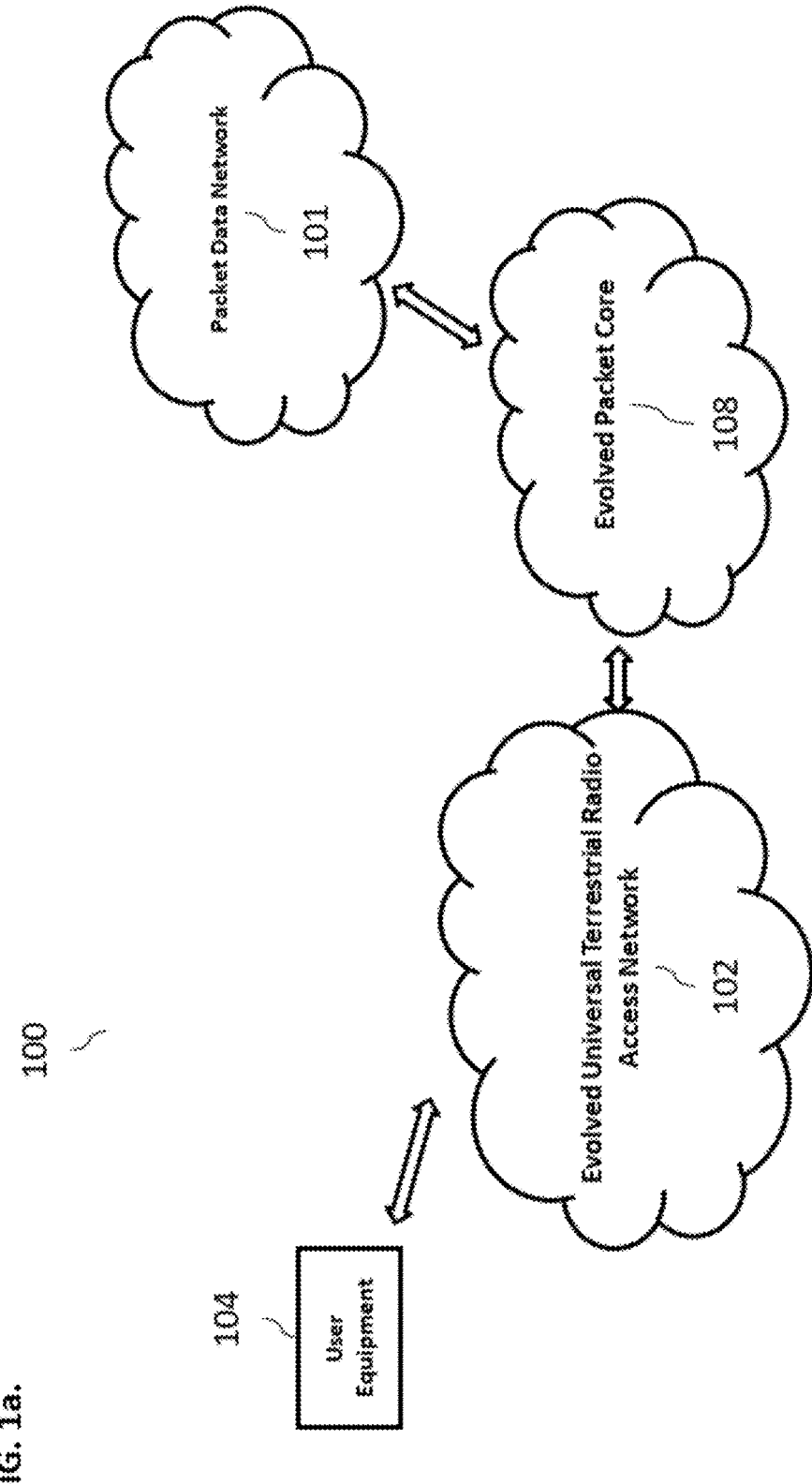
FIG. 1a illustrates an exemplary conventional long term evolution ("LTE") communications system.

The current subject matter can provide for systems and methods that can be implemented in wireless communications systems. Such systems can include various wireless communications systems, including 5G New Radio communications systems, long term evolution communication systems, etc.

In general, the current subject matter relates to determining peak connections in a distributed environment. A distributed environment such as RAN, e.g., O-RAN or virtual RAN, can include one or more base stations configured to support operations of one or more scheduling units. A plurality of UEs may be distributed across a plurality of scheduling units of the RAN. The distribution may be based on a load of each scheduling unit configured to provide wireless communication capabilities to one or more UEs. In some implementations of the current subject matter, determining peak connections in a distributed environment may facilitate efficient load distribution among the plurality of scheduling units.

In some implementations of the current subject matter, a plurality of UEs may be distributed across a plurality of scheduling units of the RAN (or other distributed network). The distribution may be based on a load of each scheduling unit. The scheduling units may be part of a centralized unit ("CU") that also includes a common entity ("CE"). Each of the scheduling units may be configured to periodically report UEs connected thereto and disconnected therefrom to the common entity of the centralized unit. The UE connections and UE disconnections may be timestamped. In this way, the common entity can be informed of UEs connected to and disconnected from each of the scheduling units in a predetermined time window. At an end of a predetermined period of time including a plurality of predetermined time windows, e.g., two time windows, three time windows, four time windows, etc., the CE may report to an operator, such as an Element Management System/Operation Support System ("EMS/OSS"), the CE can determine a maximum number of UEs connected at any one time to the scheduling units as a collective in the predetermined period of time. The operator may thus know on a predetermined time schedule defined by the predetermined period of time a maximum number of UEs connected to the scheduling units. Reporting a maximum number of UEs according to the predetermined time schedule may reduce processing burden, memory requirements, and/or bandwidth requirements.

Additionally, each scheduling unit only knows UEs connected thereto and UEs disconnected therefrom and does not know UEs connected to or disconnected from any other scheduling unit. Each scheduling unit's connections and disconnections must therefore be individually reported for each scheduling unit. Reporting a maximum number of UEs according to the predetermined time schedule may reduce processing burden, memory requirements, and/or bandwidth requirements while allowing each scheduling unit's connections and disconnections to be individually reported.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1B:
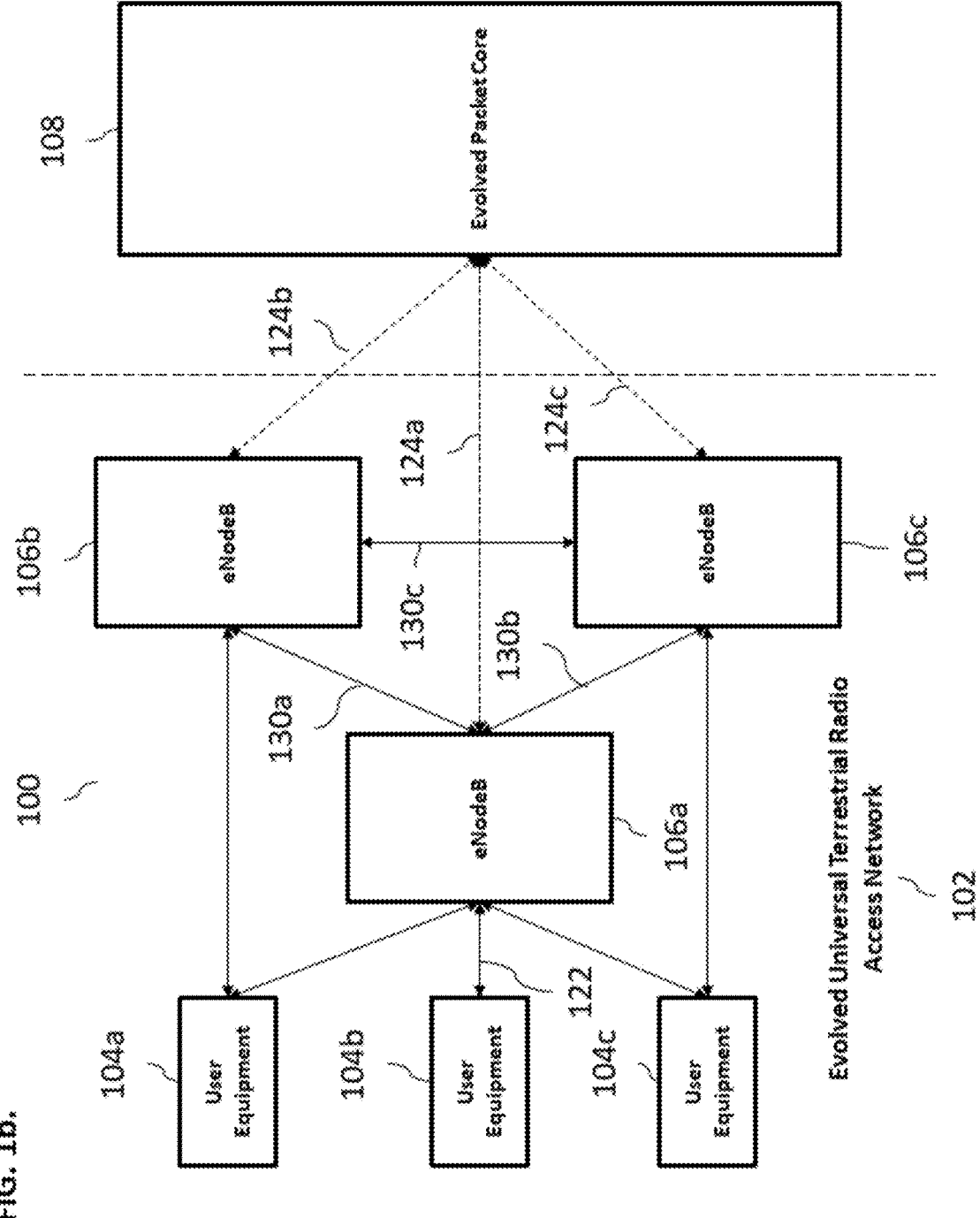

As shown in FIG. 1a, the system 100 can include an evolved universal terrestrial radio access network ("EU-TRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
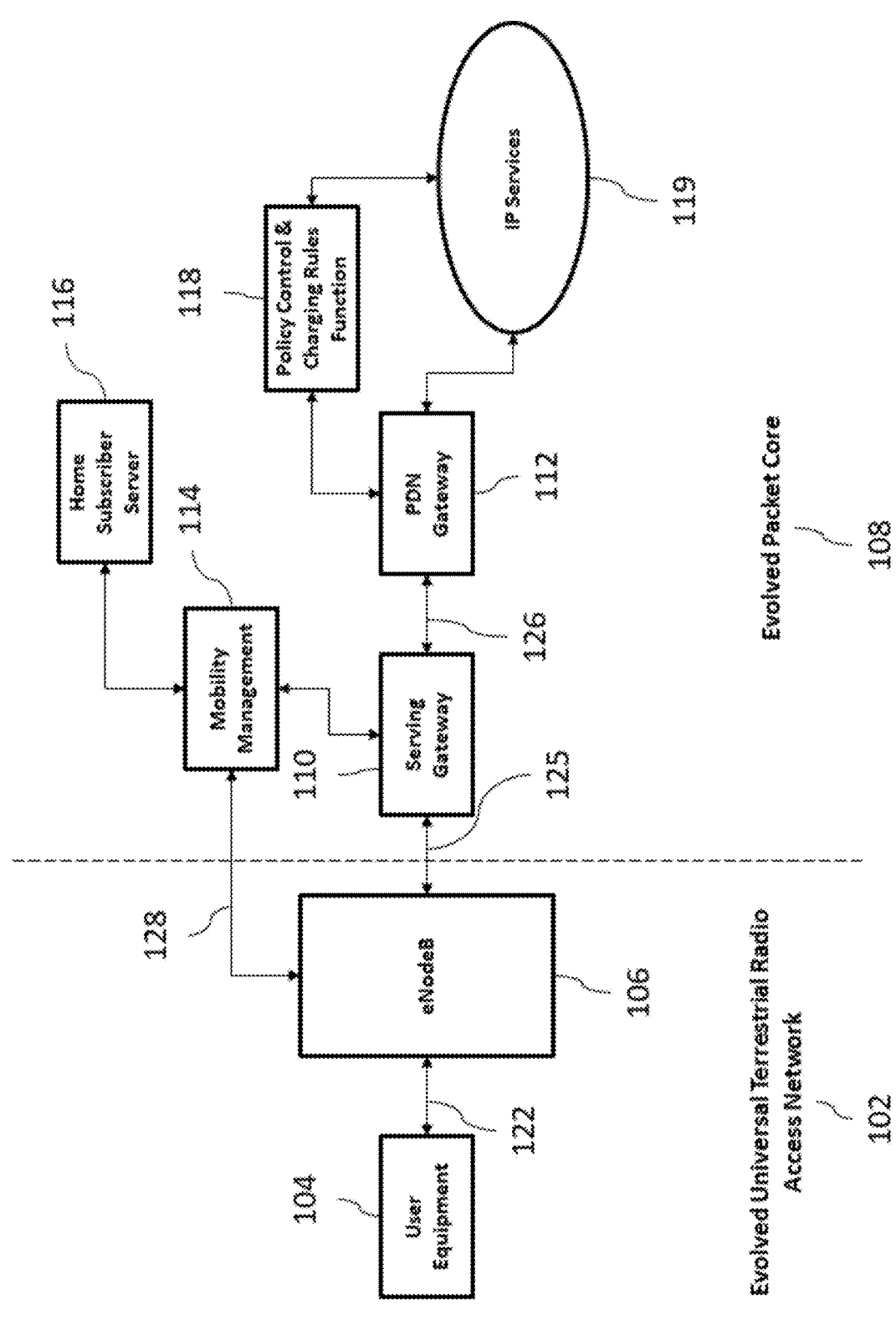

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1b, X2 interface 130a provides interconnection between eNodeB 106a and eNodeB 106b: X2 interface 130b provides interconnection between eNodeB 106a and eNodeB 106c: and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to inter-work with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the estab-lishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
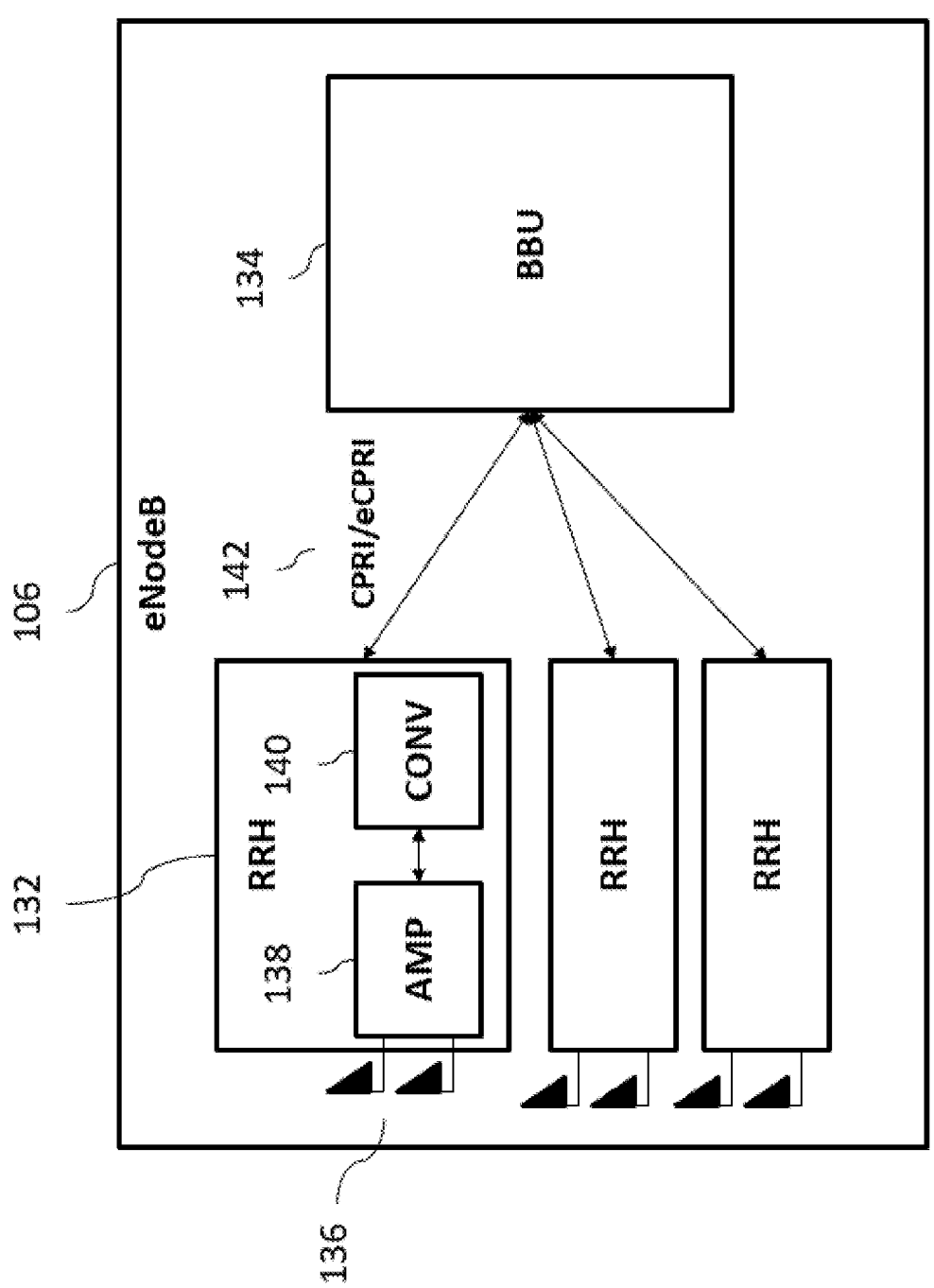

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA: uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
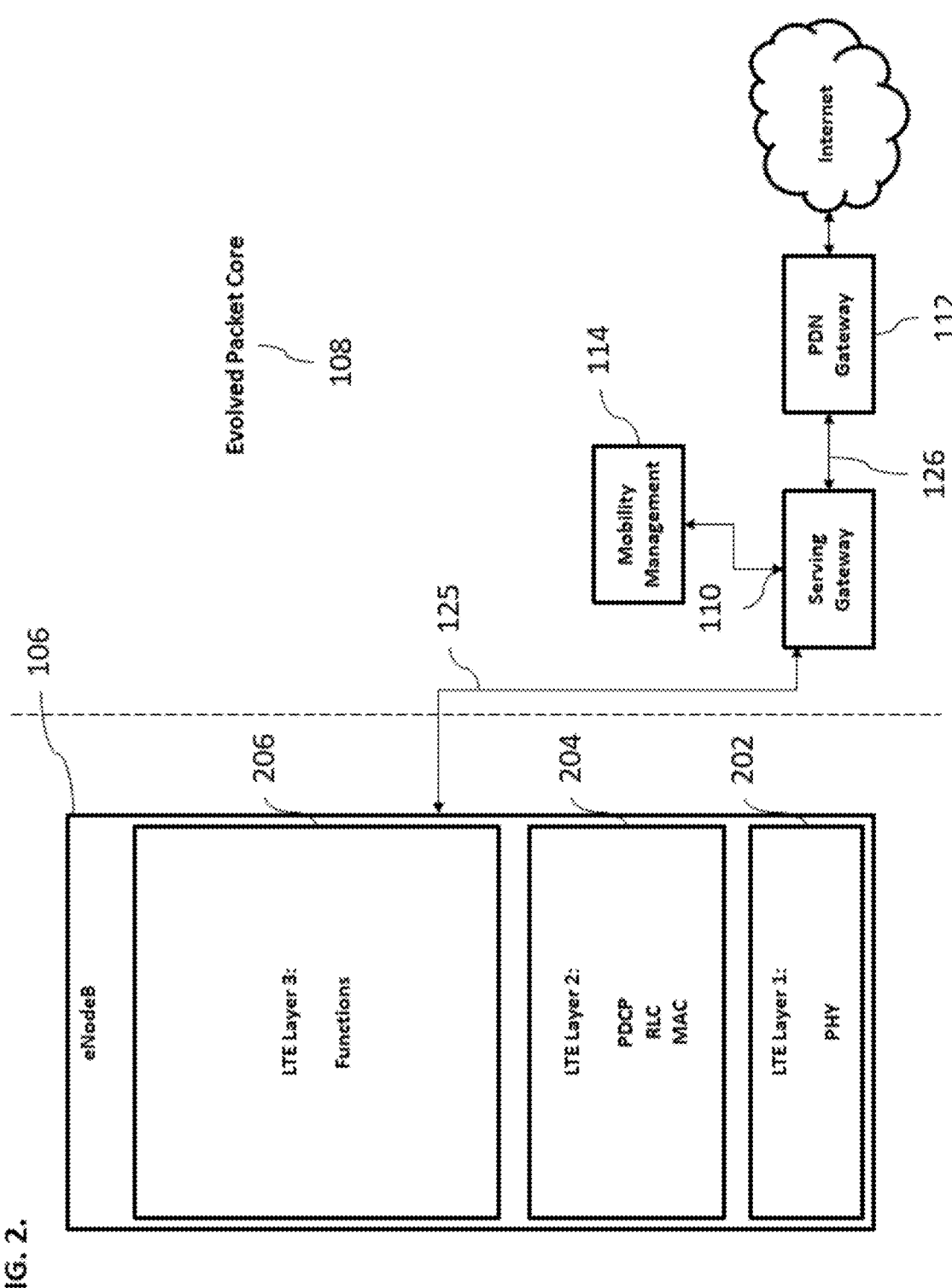
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system.

The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
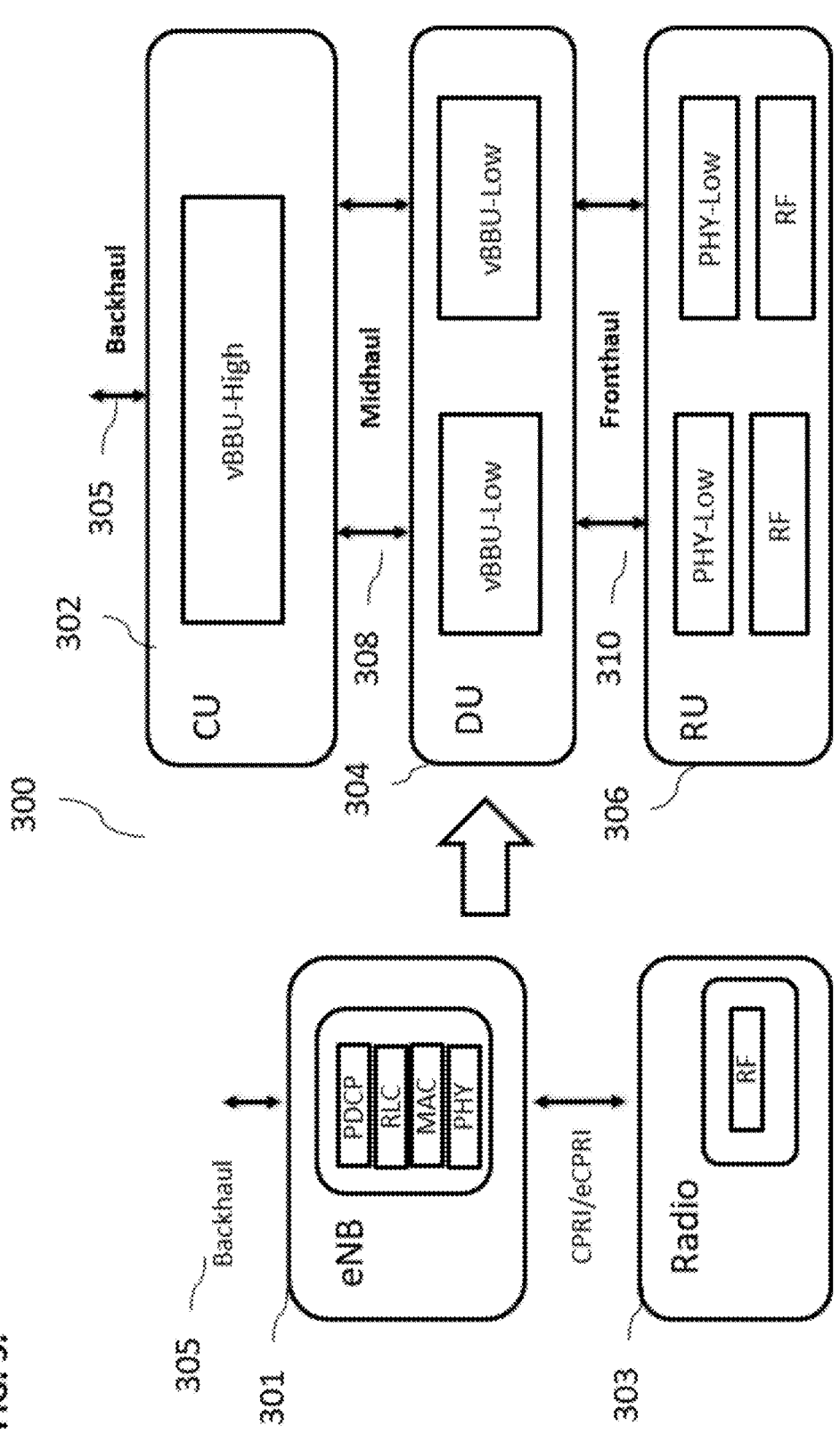
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100 s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
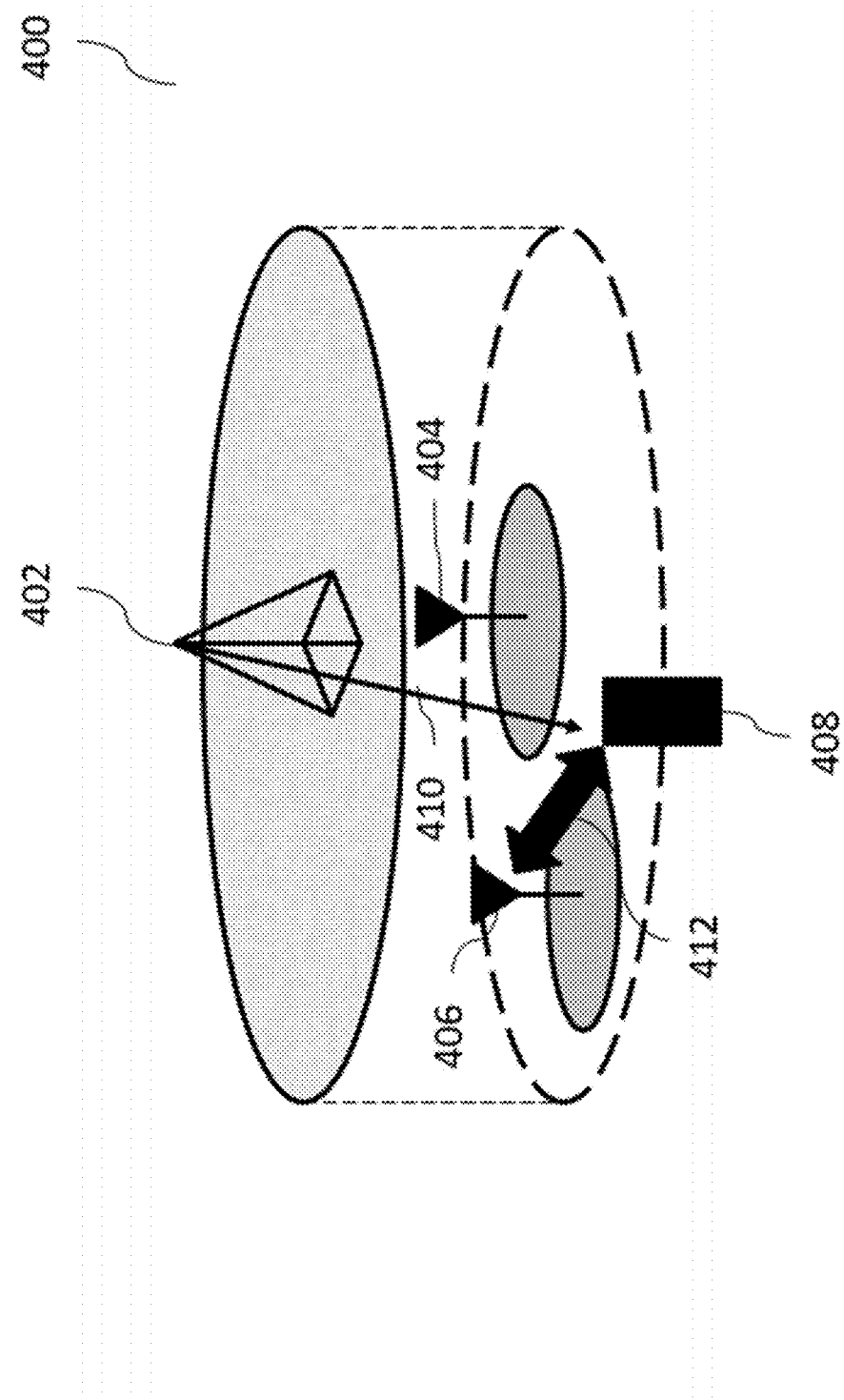
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
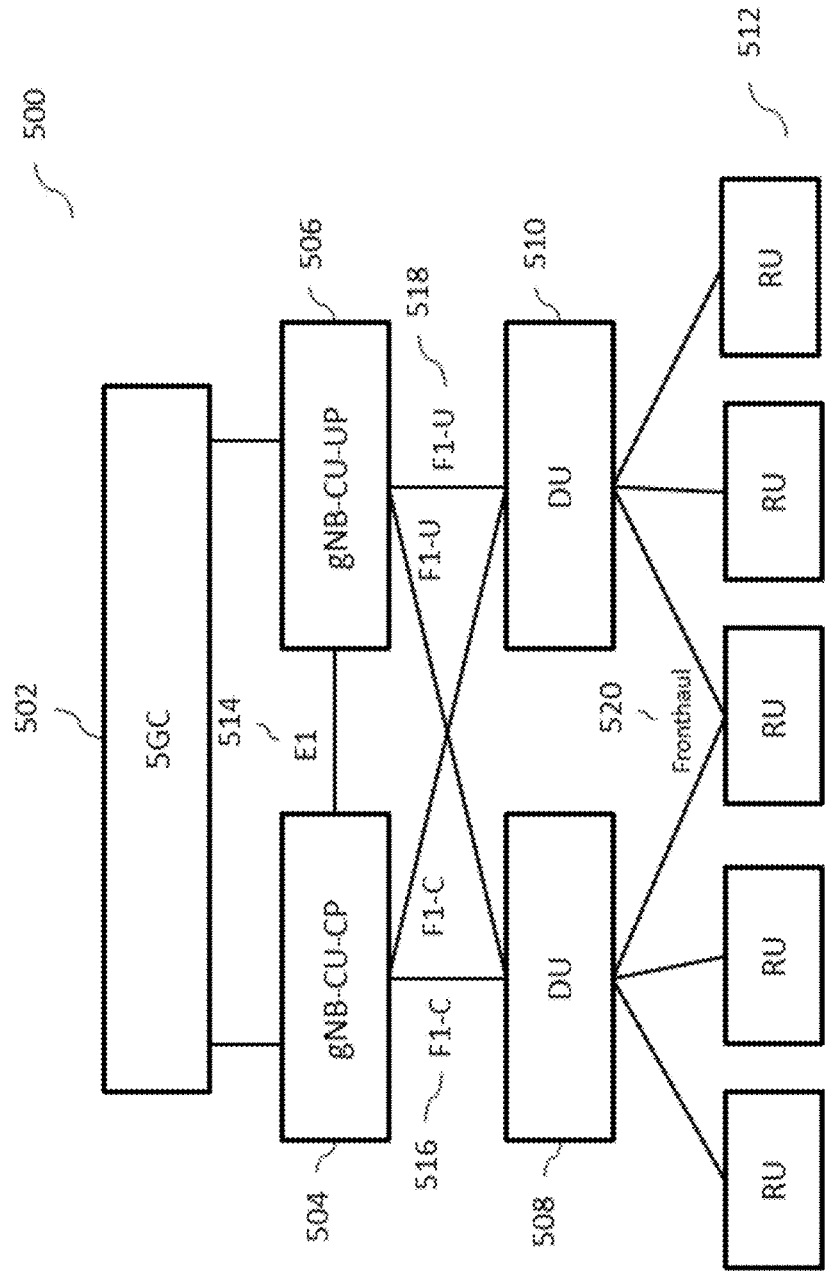
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
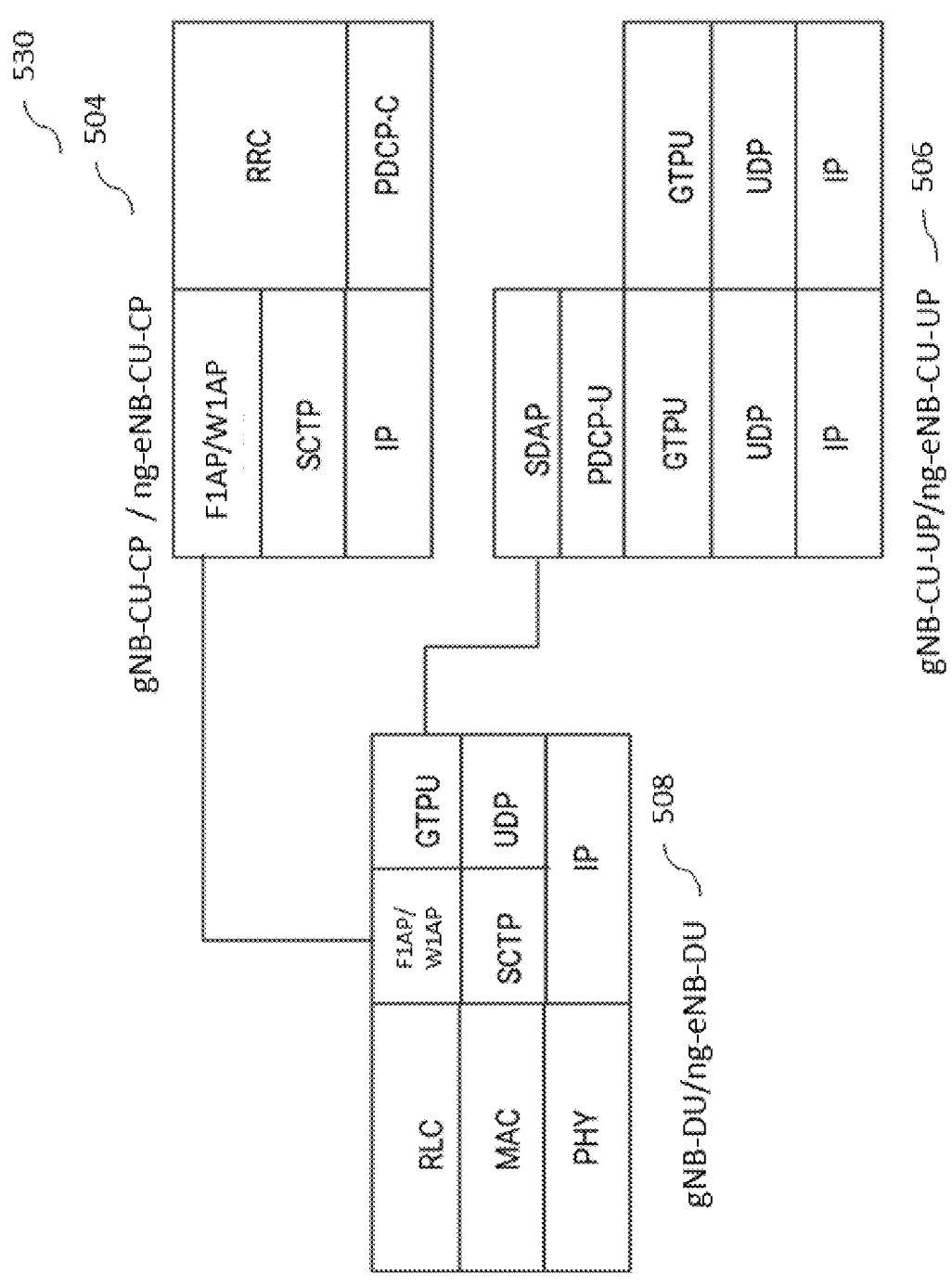
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP)

sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
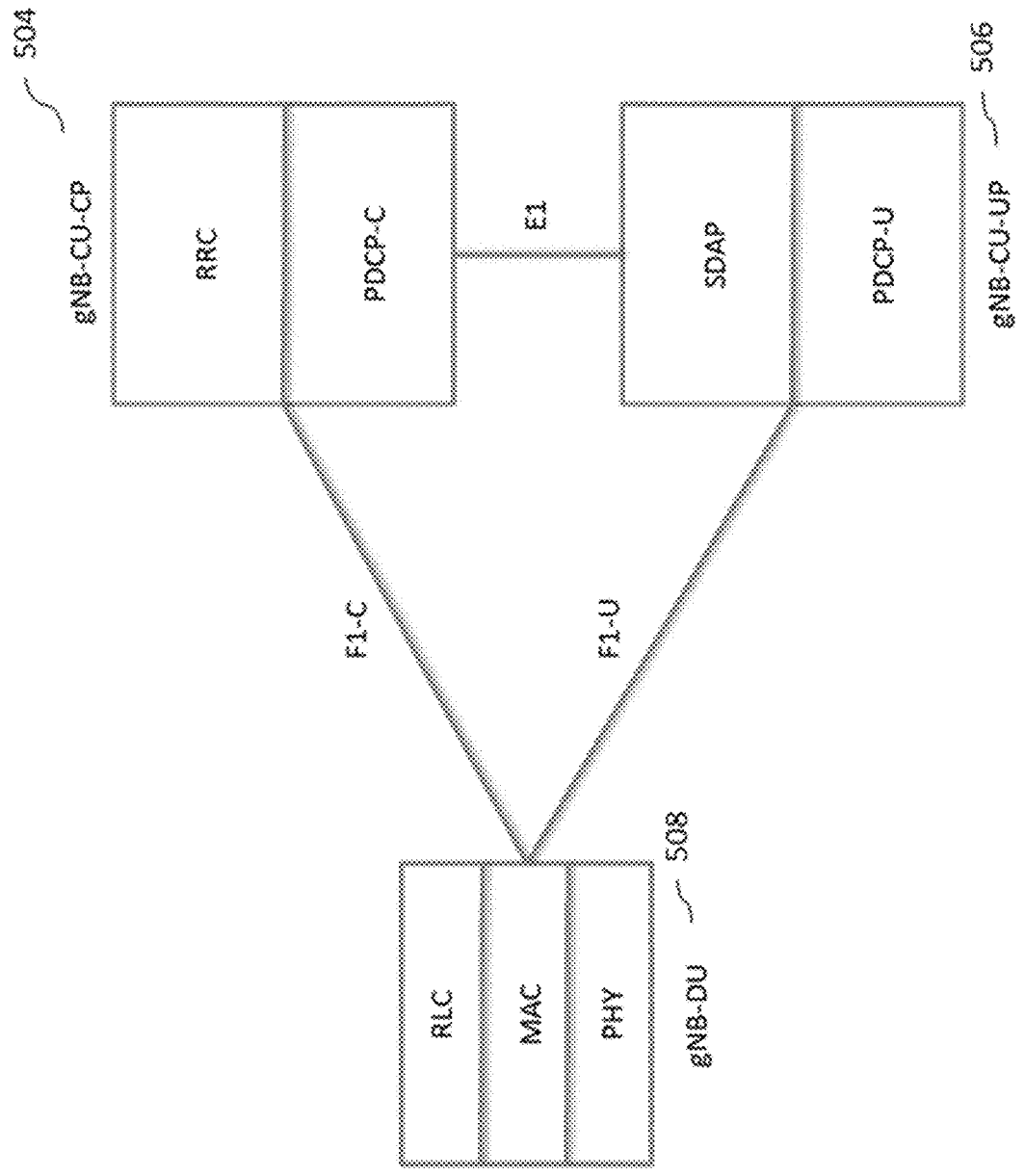
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Determining Peak Connections in a Distributed Environment

A distributed environment such as a RAN, e.g., O-RAN or virtual RAN, can include one or more base stations (e.g., gNodeB or gNB, eNodeB or eNB, ng-eNodeB or ng-eNB), such as those shown in and discussed above with regard to FIGS. 1a-5c, and/or portions thereof configured to support operations of one or more scheduling units (which may also be referred to as subscriber handling pods, subscriber managers ("SMs"), or SM pods). In general, a scheduling unit can be configured to provide wireless communication capabilities to one or more UEs (e.g., UEs 104 as shown in FIGS. 1a-1c, etc.). A scheduling unit can be assigned a unique IP address and allow applications to use ports without risking conflict. Each scheduling unit may be associated with a predetermined user equipment handling capacity, e.g., a predetermined number (e.g., but not limited to, 1250, as any other values are possible) of UEs that it can process, such as, during and/or at a particular period of time. The number of UEs may be adjustable and may be predetermined based on specific setting of the communication system, processing capabilities, and/or any other factors.

In some implementations of the current subject matter, a plurality of UEs may be distributed across a plurality of scheduling units of a RAN (or other distributed environment). The distribution may be based on a load of each scheduling unit. The scheduling units may be part of a centralized unit ("CU") that also includes a common entity ("CE"). Each of the scheduling units may be configured to periodically report UEs connected thereto and disconnected therefrom to the common entity of the centralized unit. The UE connections and UE disconnections may be time-stamped. The periodic reporting can be, for example, every one second or another amount of time. In this way, the common entity can be informed of UEs connected to and UEs disconnected from each of the scheduling units in a predetermined time window, e.g., a window of time between the periodic reportings. A UE may be considered to be connected after successfully establishing at least a type 1 Signal Radio Bearer (SRB1) connection. Similarly, a UE may be considered to be disconnected or released after loss of at least a previously established SRB1 connection.

At an end of a predetermined period of time including a plurality of predetermined time windows, e.g., two time windows, three time windows, four time windows, etc., the CE may, based on the UE connection and UE disconnection information received from each of the scheduling units, determine a maximum number of UEs connected at any one time to the scheduling units as a collective in the predetermined period of time and report to an operator, such as an Element Management System/Operation Support System ("EMS/OSS"), the determined maximum number of UEs. The predetermined period of time can be, for example, 15 minutes or another amount of time. A sum of each of the time windows in the period of time equals the predetermined period of time, for example each of four time windows being 3.75 minutes to total a 15 minute predetermined period of time, or for another example, each of five time windows being 2 minutes to total a 10 minute predetermined period of time. The operator may thus know on a predetermined time schedule, defined by the predetermined period of time, a maximum number of UEs connected to all of the scheduling units. Reporting a maximum number of UEs according to the predetermined time schedule may reduce processing burden, memory requirements, and/or bandwidth requirements.

Additionally, as mentioned above, each scheduling unit only knows UEs connected thereto and UEs disconnected therefrom and does not know UEs connected to or disconnected from any other scheduling unit. Each scheduling unit's UE connections and UE disconnections must therefore be individually reported for each scheduling unit. Reporting a maximum number of UEs according to the predetermined time schedule may reduce processing burden, memory requirements, and/or bandwidth requirements while allowing each scheduling unit's UE connections and UE disconnections to be individually reported.

One type of a RAN is Next Generation RAN ("NG-RAN"). NG-RAN, which may include O-RAN or virtual RAN, is defined by the 3GPP standards body as a radio access network capable of connecting to the 5G core communications network. NG-RAN includes the following radio access networks: NR and EUTRAN. Further, 3GPP defines various RRC connection related measurements, including a maximum number of RRC connections in a predetermined period of time, which may be referred to as a granularity period. (See 3GPP Technical Specification (TS) 32.425 V16.5.0, November 2020, "LTE; Telecommunication management: Performance Management (PM); Performance measurements Evolved Universal Terrestrial Radio Access Network (E-UTRAN)," section 4.1.3.2.) However, there is often a large number of UEs connecting and disconnecting during each predetermined period of time, so reporting a maximum number of UEs may consume a large amount of bandwidth and may require a large amount of processing resources and/or memory. In some implementations, the current subject matter may reduce processing burden, memory requirements, and/or bandwidth requirements in reporting a maximum number of RRC connections.

Figure 6:
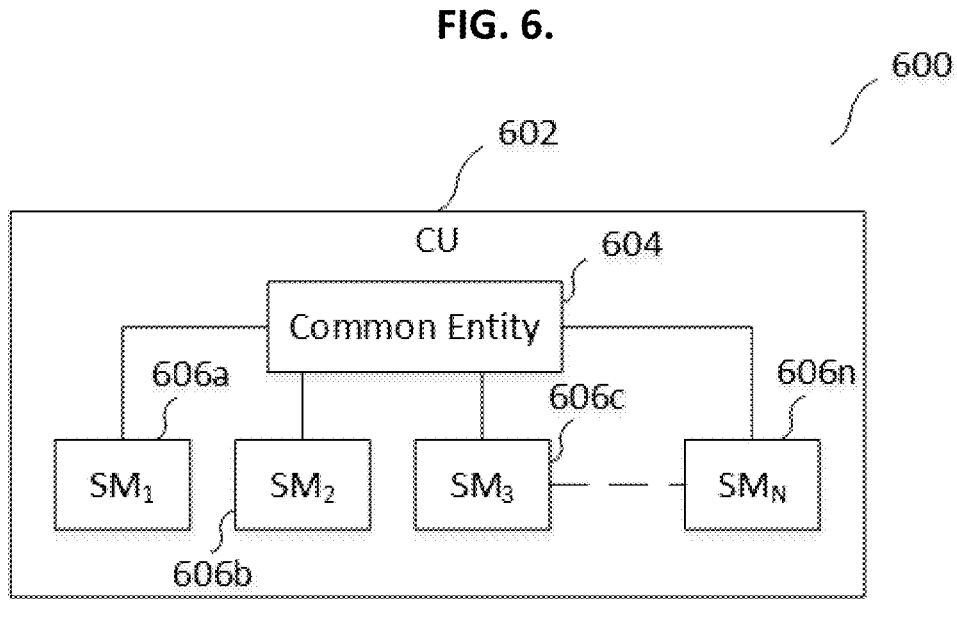
FIG. 6 illustrates an exemplary centralized unit including a common entity and a plurality of scheduling units, according to some implementations of the current subject matter.

FIG. 6 illustrates one implementation of an architecture 600 according to some implementations of the current subject matter that includes a centralized unit (CU) 602 (e.g., CU 302 shown in FIG. 3, gNB-CU logically split into gNB-CU-CP 504 and gNB-CU-UP 506 shown in FIGS. 5a-5c, etc.) including a common entity (CE) 604 and a plurality of scheduling units 606a, 606b, 606c, 606n. The scheduling units 606a, 606b, 606c, 606n are shown in FIG. 6 as scheduling managers SM1 606a, SM2 606b, SM3 606c, SMN 606n, where "N" is an integer greater than three. Each of the scheduling units 606a, 606b, 606c, 606n is configured to communicate with the CE 604.

Figure 7:
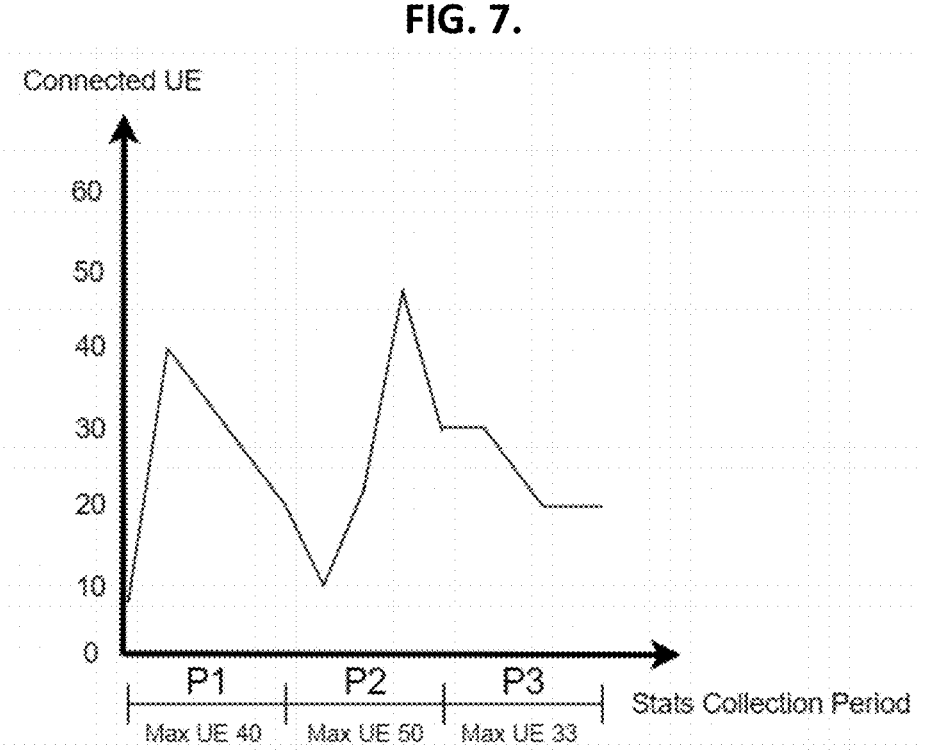
FIG. 7 illustrates a graph showing a number of connected user equipments versus time over a statistics collection period, according to some implementations of the current subject matter.

Each of the scheduling units 606a, 606b, 606c, 606n can be configured to simultaneously handle a number of UEs (not shown in FIG. 6) that fluctuates over time as UEs connect to and disconnect from their respective scheduling units 606a, 606b, 606c, 606n. FIG. 7 illustrates a graph showing one example of a maximum number of connected user equipments (UEs) versus time over a statistics collection period for the scheduling units 606a, 606b, 606c, 606n as a collective. The statistics collection period includes a first time period P1, a second time period P2 that immediately follows the first time period P1, a third time period P3 that immediately follows the second time period P2, and at least one additional time period that successively and immediately follow each other after the third time period P3. Each of the time periods P1, P2, P3, etc. is a predetermined period of time (e.g., 15 minutes or another amount of time) each including a plurality of predetermined time windows, as discussed further herein.

In the example of FIG. 7, a maximum number of UEs connected to the scheduling units is 40 in the first time period P1, a maximum number of UEs connected to the scheduling units is 50 in the second time period P2, and a maximum number of UEs connected to the scheduling units is 33 in the third time period P3. The graph thus illustrates that a number of UEs connected to the scheduling units can fluctuate over time and that a maximum number of UEs connected to the scheduling units during a time period P1, P2, P3, etc. can increase or decrease from one time period to the next. Although not shown in the example of FIG. 7, a maximum number of UEs connected to the scheduling units during a time period can in some instances be the same from one time period P1, P2, P3, etc. to the next.

Figure 8:
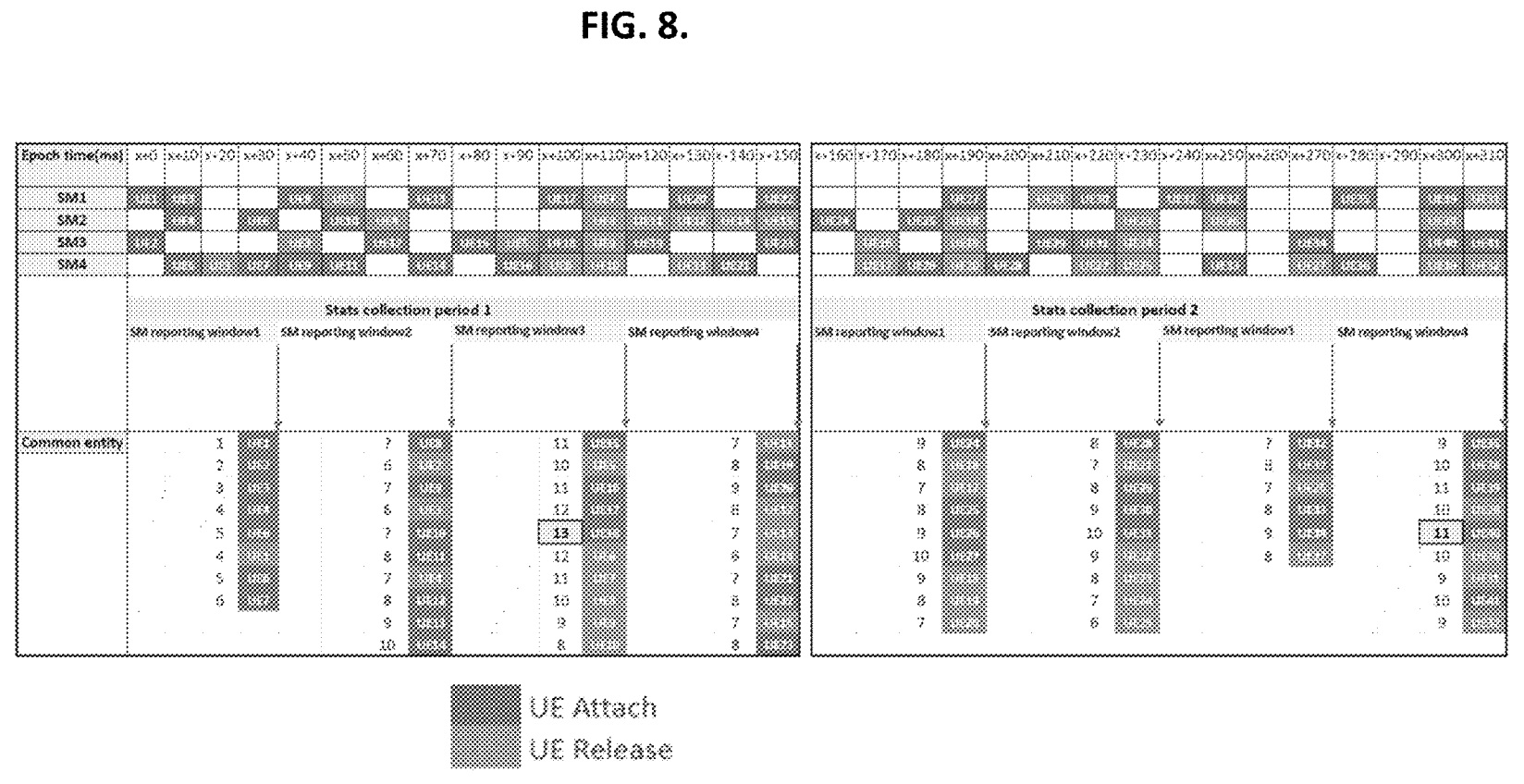

FIG. 8 illustrates one implementation of scheduling unit reporting according to some implementations of the current subject matter. In the implementation of FIG. 8, each of first, second, third, and fourth scheduling units (scheduling managers) SM1, SM2, SM3, SM4 (e.g., scheduling units 606a, 606b, 606c, 606n of FIG. 6 with "N" equaling four in the implementation of FIG. 8, etc.) is configured to communicate with a common entity (e.g., CE 604 of FIG. 6, etc.). Although four scheduling units SM1, SM2, SM3, SM4 are illustrated in FIG. 8, a different number of scheduling units may be used, as discussed herein.

FIG. 8 illustrates UEs connected to and disconnected from the scheduling units SM1, SM2, SM3, SM4 over time (shown in this implementation as Epoch time in ms) in four predetermined time windows (SM reporting window1, SM reporting window2, SM reporting window3, SM reporting window4) in each of two predetermined periods of times (statistics (stats) collection period and statistics (stats) collection period2). As mentioned above, the predetermined period of time can be, for example, 15 minutes or another amount of time. As also mentioned above, a sum of each of the time windows (referred to in FIG. 8 as "reporting windows") in the period of time can equal the predetermined period of time, for example each of the four time windows predetermined time windows (SM reporting window1, SM reporting window2, SM reporting window3, SM reporting window4) being 3.75 minutes to total a 15 minute predetermined period of time.

Although each of the predetermined periods of time is shown in FIG. 8 to include four time windows, each predetermined period of time can have another number of time windows. Also, although only two predetermined periods of time are shown in FIG. 8 with the second predetermined period of time immediately following the first predetermined period of time, at least one additional predetermined period of time can follow the second predetermined period of time with each of the at least one additional predetermined periods of time immediately following one another.

Each of the scheduling units SM1, SM2, SM3, SM4 can be configured to communicate UE connections and disconnections to the CE in each of the predetermined time windows. The scheduling units SM1, SM2, SM3, SM4 can be configured to transmit this information periodically, such as on the order of seconds or minutes, in a message to the CE. The message can include time stamped UE connection and disconnection information. The CE may thus receive UE connection/disconnection information from each of the scheduling units SM1, SM2, SM3, SM4 throughout each the predetermined periods of time in each of the four time windows in each predetermined period of time in this illustrated implementation.

Less bandwidth, less memory, and fewer processing resources may therefore be needed than if UE connection/disconnection information was transmitted to the CE in real time on an individual UE connection/disconnection basis since a single message may contain information regarding multiple UE connection/disconnection events for a scheduling unit. Each of the UE connection/disconnection events being time stamped in the message can allow the CE to know an order of the UE connection/disconnection events across each individual scheduling unit and among the scheduling units SM1, SM2, SM3, SM4 as a collective even though the CE is not receiving UE connection/disconnection information in real time in time order but instead within time windows.

Figures 9, 10:
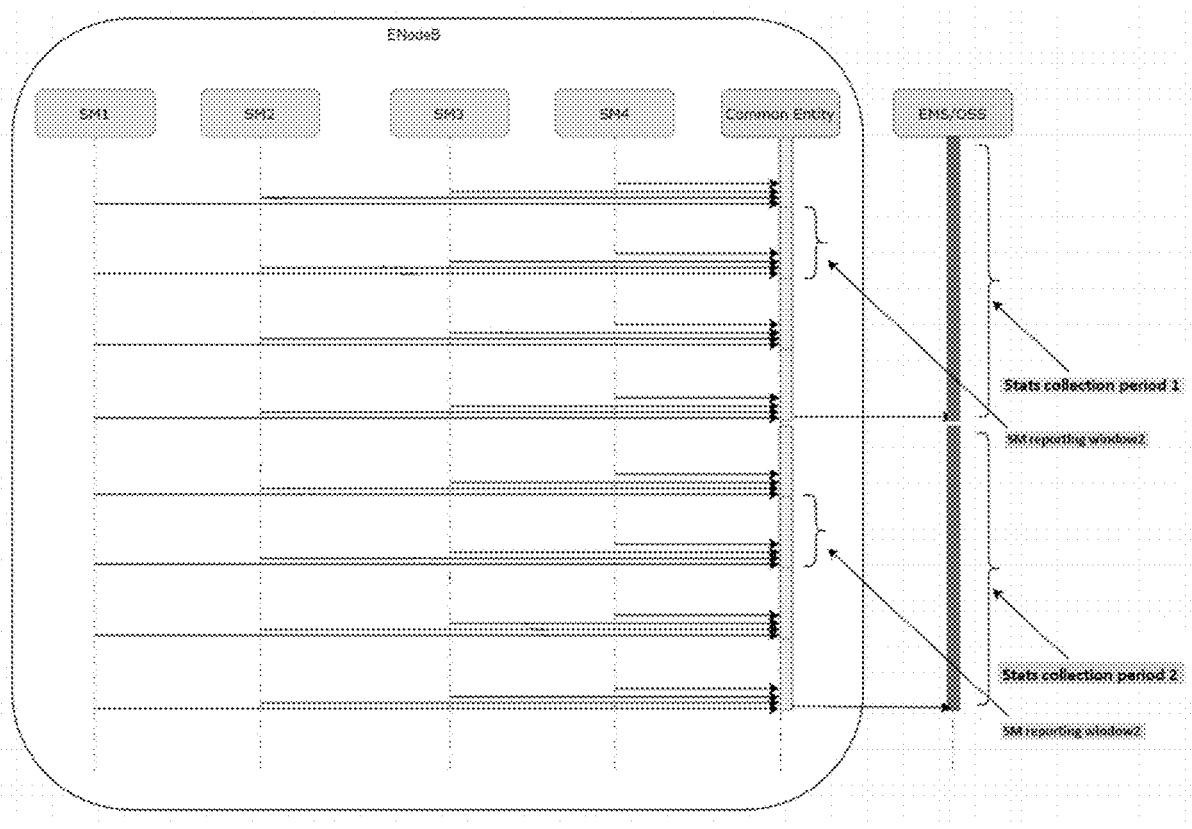
FIG. 9 illustrates exemplary contents of a message, according to some implementations of the current subject matter.
FIG. 10 illustrates the scheduling units of FIG. 8 reporting to a common entity at an end of each of the time windows and the common entity reporting to an Element Management System/Operation Support System at an end of each period of time, according to some implementations of the current subject matter.

FIG. 9 illustrates one implementation of a message a scheduling unit, e.g., each of the scheduling units SM1, SM2, SM3, SM4, can be configured to transmit to the CE indicating UE connections to the scheduling unit and disconnections from the scheduling unit in a time window, where +1 indicates a new UE connection to the scheduling unit and −1 indicates disconnection or release of the UE from the scheduling unit. Each of the UE connection/disconnection events in the message is time stamped (in Epoch time corresponding to the implementation shown in FIG. 8 that shows Epoch time).

FIG. 10 illustrates one implementation of the scheduling units SM1, SM2, SM3, SM4 transmitting a message (e.g., the message of FIG. 9) to the CE. FIG. 10 also illustrates a base station in the form of an ENodeB including the scheduling units SM1, SM2, SM3, SM4 and the CE, but as discussed above, the base station can be in another form.

In the first predetermined time window in the first predetermined stats collection period1 shown in FIG. 8, a first connected user equipment UE1 connects to the first scheduling unit SM1 and a second connected user equipment UE2 connects to the third scheduling unit SM3 at Epoch time zero: a third connected user equipment UE3 connects to the first scheduling unit SM1, a fourth connected user equipment UE4 connects to the second scheduling unit SM2, and a fifth connected user equipment UE5 connects to the fourth scheduling unit SM4 in a time zone of Epoch time zero plus 10 ms: a first disconnected user equipment UE1 disconnects from the fourth scheduling unit SM4 in a time zone between Epoch time zero plus 10 ms and Epoch time zero plus 20 ms: and a sixth connected user equipment UE6 connects to the second scheduling unit SM2 and a seventh connected user equipment UE7 connects to the fourth scheduling unit SM4 in a time zone between Epoch time zero plus 20 ms and Epoch time zero plus 30 ms.

The CE can order the UE connections and disconnections by time, as shown in the "Common Entity" row of FIG. 8 in the first, second, third, and fourth predetermined time window columns, due to the UE connections/disconnections being time stamped in the messages from the scheduling units SM1, SM2, SM3, SM4. The CE can thus determine a maximum number of connected UEs at any one time within the first predetermined time window, as the maximum number will change within the first predetermined time window as UEs connect and disconnect from the scheduling units SM1, SM2, SM3, SM4. As shown in this example, a maximum or peak number of UEs connected to the scheduling units SM1, SM2, SM3, SM4 at any one time in the first predetermined time window is six (due to seven UE connections and one UE disconnection in the first predetermined time window). The scheduling units SM1, SM2, SM3, SM4 can similarly report UE connection and disconnection information to the CE for each of the other three predetermined time windows in the first predetermined time period, as shown in FIGS. 8 and 10. As shown in FIG. 8, a maximum or peak number of UEs connected to the scheduling units SM1, SM2, SM3, SM4 at any one time in the second predetermined time window is ten (due to seven UE connections and three UE disconnections in the second predetermined time window), in the third predetermined time window is thirteen (due to four UE connections and six UE disconnections in the third predetermined time window), and in the fourth predetermined time window is nine (due to five UE connections and five UE disconnections in the fourth predetermined time window) The CE can thus determine at an end of the first predetermined time period that at any one time in the first predetermined time period, a maximum or peak number of UEs connected to the scheduling units SM1, SM2, SM3, SM4 is thirteen, as shown by the bolded box in the first predetermined time period in FIG. 8.

The scheduling units SM1, SM2, SM3, SM4 can also similarly report UE connection and disconnection information to the CE in each of the four predetermined time windows in the second predetermined time period, as shown in FIGS. 8 and 10. The CE can thus determine at an end of the second predetermined time period that at any one time in the second predetermined time period, a maximum or peak number of UEs connected to the scheduling units SM1, SM2, SM3, SM4 is eleven, as shown by the bolded box in the second predetermined time period in FIG. 8.

At an end of each of the first and second predetermined periods of time, as shown in FIG. 10, the CE may report to an operator, such as an Element Management System/Operation Support System ("EMS/OSS") as in this illustrated implementation, a maximum or peak number of UEs connected to the scheduling units SM1, SM2, SM3, SM4 in the predetermined period of time. The EMS/OSS may thus receive one message from the CE for each of the predetermined periods of time. Less bandwidth, less memory, and fewer processing resources may therefore be needed than if UE connection/disconnection information was transmitted to the EMS/OSS from the CE on more frequent basis, e.g., more than once for each of the predetermined time periods, since a single message may contain information for the entire predetermined period of time.

In some implementations, the current subject matter can be configured to be implemented in a system 1100, as shown in FIG. 11. The system 1100 can include one or more of a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 600. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

FIG. 12 illustrates an exemplary method 1200 for determining peak connections in a distributed environment, according to some implementations of the current subject matter. The method 1200 may be performed, for example, using implementations shown in and described with respect to FIGS. 6-10.

The method 1200 includes receiving 1202, according to a predetermined time schedule, data indicating a number of UEs (e.g., UEs 104 as shown in FIGS. 1a-1c, UEs as shown in FIG. 8, etc.) connected to and a number of UEs disconnected from each of a plurality of scheduling units (e.g., subscriber managers 606a, 606b, 606c, 606n as shown in FIG. 6, subscriber managers SM1, SM2, SM3, SM4 as shown in FIGS. 8 and 10, etc.) of a RAN during each of a plurality of time windows (e.g., first, second, third, and fourth predetermined time windows as shown in FIGS. 8 and 10, etc.) in a first period of time (e.g., first predetermined time period or second predetermined time period as shown in FIGS. 8 and 10, etc.). The method 1200 also includes determining 1204, based on the received data, a maximum number of UEs connected to the scheduling units, e.g., a maximum of all connected UEs across all of the scheduling units, at a time in the first period of time. The method 1200 also includes transmitting the determined maximum number of UEs to a network manager (e.g., EMS/OSS shown in FIG. 10, etc.) of the RAN.

In some implementations, the current subject matter can include one or more of the following optional features. In some implementations, the received data may be time stamped such that the time of the maximum number of UEs connected to the scheduling units is a known time.

In some implementations, the predetermined time schedule may be such that data is received after each successive passage of a predetermined period of time in each of the time windows.

In some implementations, the data may be received at an end of each of the plurality of time windows.

In some implementations, each of the time windows may be a predetermined length of time, and the first period of time may be a sum of each of the predetermined lengths of time.

In some implementations, the determined maximum number of UEs may be transmitted to the network manager after an end of the first period of time.

In some implementations, the method may further include repeating the receiving, the determining, and the transmitting for each of at least one additional period of time after the first period of time.

In some implementations, the scheduling units may be associated with at least one of: a control plane component and a user plane component of a centralized unit of a base station. Further, the scheduling units may be associated with the control plane component of the centralized unit of the base station, and/or the base station may include at least one of the following: an eNodeB base station, a gNodeB base station, a wireless base station, a wireless access point, and any combination thereof. Further, the base station may include a centralized unit having a processor communicatively coupled to a memory, and the receiving, the determining, and the transmitting may be performed by the centralized unit. Further, the centralized unit may include at least one of: a control plane component, a user plane component, and any combination thereof. Further, the centralized unit may be communicatively coupled with at least one distributed unit (DU), each of the at least one DUs may be communicatively coupled with at least one radio unit (RU), and the UEs connected to the scheduling units may be communicatively coupled to the at least one RUs. Further, the centralized unit may be operating in an open-radio access network (O-RAN) or in a virtual RAN.

In some implementations, the receiving, the determining, and the transmitting may be performed by a base station in a wireless communication system. Further, the base station may include at least one of the following: an eNodeB base station, a gNodeB base station, a wireless base station, a wireless access point, and any combination thereof. Further, the base station may include a centralized unit having a processor communicatively coupled to a memory, and the receiving, the determining, and the transmitting may be performed by the centralized unit. Further, the centralized unit may include at least one of: a control plane component, a user plane component, and any combination thereof. Further, the centralized unit may be communicatively coupled with at least one distributed unit (DU), each of the at least one DUs may be communicatively coupled with at least one radio unit (RU), and the UEs connected to the scheduling units may be communicatively coupled to the at least one RUs. Further, the centralized unit may be operating in an open-radio access network (O-RAN) or in a virtual RAN.

In some implementations, the receiving, the determining, and the transmitting may be performed by a radio access network (RAN) node having at least one processor communicatively coupled to at least one memory.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    receiving, according to a predetermined time schedule, data indicating a number of user equipments (UEs) connected to and a number of UEs disconnected from each of a plurality of scheduling units of a radio access network (RAN) during each of a plurality of time windows in a first period of time, wherein a plurality of data respectively indicating the number of UEs is received for a scheduling unit, among the plurality of scheduling units, respectively for the plurality of time windows;
    determining, based on the received data, a maximum number of UEs connected to the plurality of scheduling units at a time in the first period of time, the maximum number being a single number for an entirety of the first period of time; and
    transmitting the determined maximum number of UEs to a network manager of the RAN configured to perform load balancing across the plurality of scheduling units based on the transmitted determined maximum number of UEs.

2. The method of claim 1, wherein the received data is time stamped such that the time of the maximum number of UEs connected to the plurality of scheduling units is a known time.

3. The method of claim 1, wherein the predetermined time schedule is such that data is received after each successive passage of a predetermined period of time in each of the plurality of time windows.

4. The method of claim 1, wherein the data is received at an end of each of the plurality of time windows.

5. The method of claim 1, wherein each of the plurality of time windows is a predetermined length of time; and
    the first period of time is a sum of each of the predetermined lengths of time.

6. The method of claim 1, wherein the determined maximum number of UEs is transmitted to the network manager after an end of the first period of time.

7. The method of claim 1, further comprising repeating the receiving, the determining, and the transmitting for each of at least one additional period of time after the first period of time.

8. The method of claim 1, wherein the plurality of scheduling units are associated with at least one of: a control plane component and a user plane component of a centralized unit of a base station.

9. The method of claim 8, wherein the plurality of scheduling units are associated with the control plane component of the centralized unit of the base station.

10. The method of claim 8, wherein the base station includes at least one of the following: an eNodeB base station, a gNodeB base station, a wireless base station, a wireless access point, and any combination thereof.

11. The method of claim 8, wherein the centralized unit is communicatively coupled with at least one distributed unit (DU);
    each of the at least one DUs is communicatively coupled with at least one radio unit (RU); and
    the UEs connected to the plurality of scheduling units are communicatively coupled to the at least one RUs.

12. The method of claim 8, wherein the centralized unit is operating in an open radio access network (O-RAN) or in a virtual RAN.

13. The method of claim 1, wherein the receiving, the determining, and the transmitting are performed by a base station in a wireless communication system.

14. The method of claim 13, wherein the base station includes a centralized unit having a processor communicatively coupled to a memory; and
    the receiving, the determining, and the transmitting are performed by the centralized unit.

15. The method of claim 14, wherein the centralized unit includes at least one of: a control plane component, a user plane component, and any combination thereof.

16. The method of claim 1, wherein the receiving, the determining, and the transmitting are performed by a radio access network (RAN) node having at least one processor communicatively coupled to at least one memory.

17. An apparatus, comprising:
    at least one processor, and
    at least one non-transitory storage media storing instructions that, when executed by the at least one processor, cause the at least one processor to perform operations comprising:
        receiving, according to a predetermined time schedule, data indicating a number of user equipments (UEs) connected to and a number of UEs disconnected from each of a plurality of scheduling units of a radio access network (RAN) during each of a plurality of time windows in a first period of time, wherein a plurality of data respectively indicating the number of UEs is received for a scheduling unit, among the plurality of scheduling units, respectively for the plurality of time windows;
        determining, based on the received data, a maximum number of UEs connected to the plurality of scheduling units at a time in the first period of time, the maximum number being a single number for an entirety of the first period of time; and
        transmitting the determined maximum number of UEs to a network manager of the RAN configured to perform load balancing across the plurality of scheduling units based on the transmitted determined maximum number of UEs.

18. At least one non-transitory storage media storing instructions that, when executed by at least one processor, cause the at least one processor to perform operations comprising:
    receiving, according to a predetermined time schedule, data indicating a number of user equipments (UEs) connected to and a number of UEs disconnected from each of a plurality of scheduling units of a radio access network (RAN) during each of a plurality of time windows in a first period of time, wherein a plurality of
data respectively indicating the number of UEs is
received for a scheduling unit, among the plurality of
scheduling units, respectively for the plurality of time
windows; 5
determining, based on the received data, a maximum
number of UEs connected to the plurality of scheduling
units at a time in the first period of time, the maximum
number being a single number for an entirety of the first
period of time; and 10
transmitting the determined maximum number of UEs to
a network manager of the RAN configured to perform
load balancing across the plurality of scheduling units
based on the transmitted determined maximum number
of UEs. 15

* * * * *